UNITED STATES PATENT OFFICE.

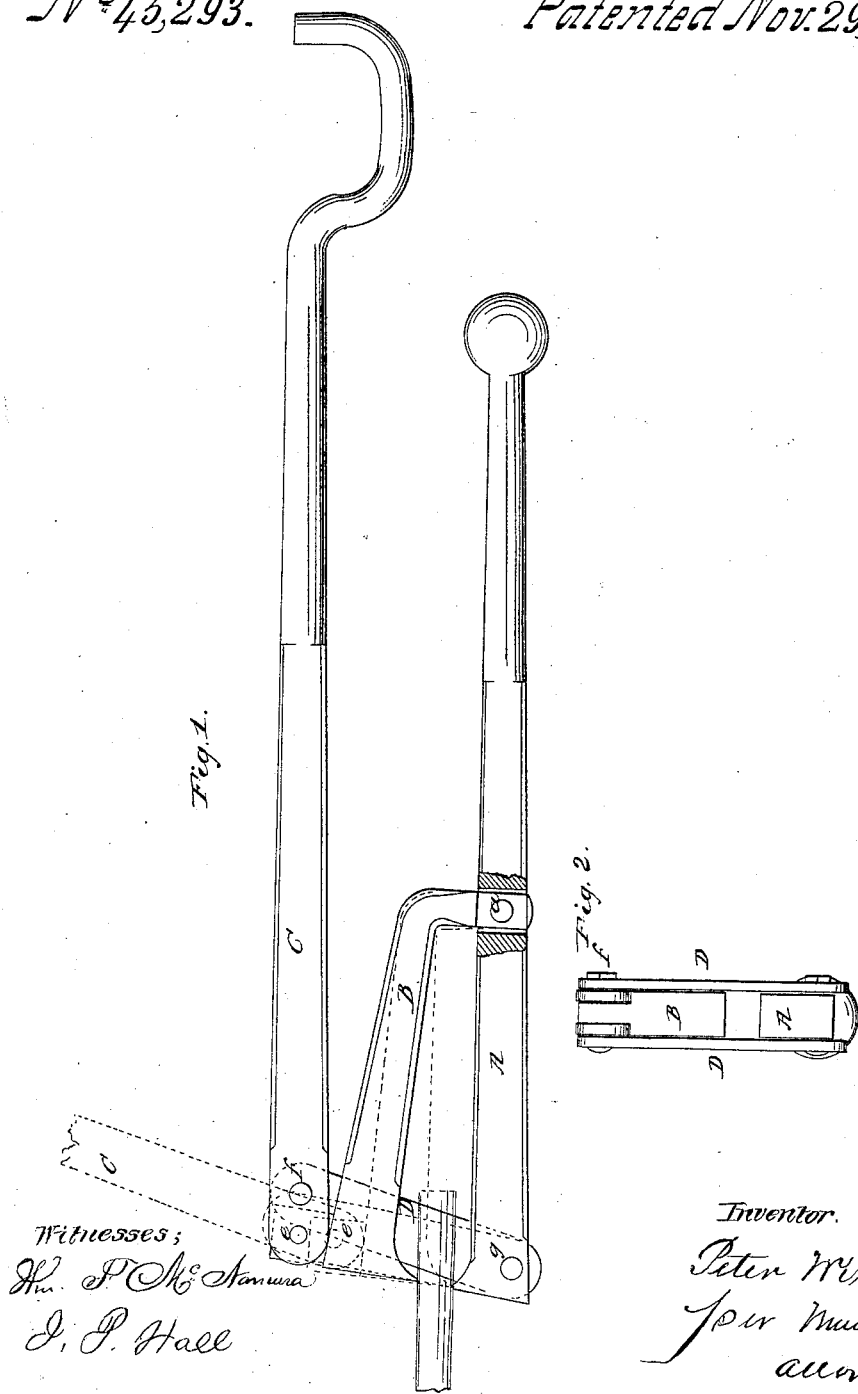

PETER WIXCEL, OF LAFAYETTE, ILLINOIS.

IMPROVEMENT IN TOOLS FOR CUTTING RIVETS.

Specification forming part of Letters Patent No. 45,293, dated November 29, 1864.

*To all whom it may concern:*

Be it known that I, PETER WIXCEL, of Lafayette, in the county of Stark and State of Illinois, have invented a new and useful Improvement in Bolt and Rivet Cutters; and I do hereby declare that the following is a full, clear, and exact description thereof, which will enable others skilled in the art to make and use the same, reference being had to the accompanying drawings, making a part of this specification, in which—

Figure 1 represents a side elevation of the cutter; Fig. 2, an end view of the same, showing the faces of the cutting-jaws.

Similar letters of reference indicate like parts.

A represents the bed-piece, which is brought at its outer end to a chisel-edge, as shown in the drawings.

B is a movable cutter, having its chisel-edge opposite that of the bed-piece A, and connected by a fulcrum-pin, $a$. The cutter B is connected to a lever, C, by a joint, $e$, of ordinary construction, as shown in both figures, so that the cutter B is raised and lowered with the lever. The lever C and the bed-piece A are connected together by straps D, the pin $f$, which connects them to the lever C, being at a point in the lever which shall permit the lever C and the strap to be brought into the same vertical plane, the distance from the center of the pin $f$ to the end of the lever and the faces of the cutters being together equal to the length of the straps D. The end of the lever C is turned off from the center of the joint-pin $e$, so as always to bear upon the movable cutter B.

It will be seen that in the cutter constructed as above shown there is a constant increase of power, as the joint-pins $e$ and $f$ are gradually brought into the same vertical plane, the cam formed by the end of the lever C having then its greatest throw. Thus I cause the cutting-power to increase until the work is completed.

I am aware of an implement for a like purpose said to have been patented by B. Cotant, of Greenwich Station, Ohio, May 19, 1863, in which two levers—the lower one with a chisel-edge—are brought together, a cam upon the lower face of the upper lever being thus brought down upon back of a movable cutter, which is then brought back by a spring. It results from this arrangement that there is a decrease of power as the cutting proceeds; and, moreover, as the bridle in Cotant's implement is rigidly secured to the lower jaw or bed-piece, it follows that a portion of the force brought to bear upon the cam will tend to force the lower jaw out of its proper position, and thus as much force will be required to keep it in proper position as is necessary to apply to the cutters to do the work required of them. This objection does not apply to my implement, as the bridle is attached to the lower jaw by a fulcrum-pin, $g$.

Having thus described my invention, I claim as new and desire to secure by Letters Patent—

Connecting the movable jaw B to the cam-lever by means of the joint $e$, or its equivalent, substantially as described.

PETER WIXCEL.

Witnesses:
   J. M. JONES,
   E. G. HILL.